United States Patent Office 3,790,579
Patented Feb. 5, 1974

3,790,579
1-OXA-2,4,8-TRIAZASPIRO[4,5]DEC-2-ENES
Michio Nakanishi, Nakatsu, Katsuo Arimura, Yoshitomi-machi, and Hideki Ao, Nakatsu, Japan, assignors to Yoshitomi Pharmaceutical Industries, Ltd., Osaka, Japan
No Drawing. Filed Aug. 19, 1971, Ser. No. 173,327
Claims priority, application Japan, Aug. 19, 1970, 45/72,932
Int. Cl. C07d 85/52
U.S. Cl. 260—293.58          13 Claims

ABSTRACT OF THE DISCLOSURE 1-oxa-2,4,8-triazaspiro[4,5]dec-2-enes of the formula:

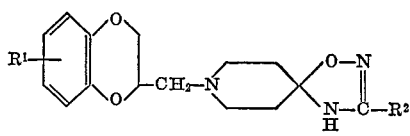

and the pharmaceutically acceptable acid addition salts thereof, wherein $R^1$ is H, Cl, $CH_3$ or $OCH_3$; and $R^2$ is an alkyl group of from 1 to 3 carbon atoms, a benzyl group, a phenyl group and a substituted phenyl group in which the substituent is selected from the group consisting of Cl, $CH_3$ and $OCH_3$. These compounds are useful as vasodilators and can be prepared by reacting a functional derivative of the corresponding benzodioxanylmethanol with the corresponding new oxatriazaspirodecene.

BACKGROUND OF THE INVENTION 1-oxa-2,4,8-triazaspiro[4,5]dec-2-enes of the formula:

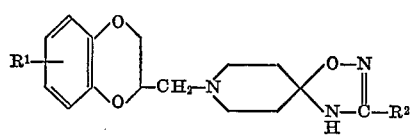

and the pharmaceutically acceptable acid addition salts thereof, wherein $R^1$ is H, Cl, $CH_3$ or $OCH_3$; and $R^2$ is an alkyl group of from 1 to 3 carbon atoms, a benzyl group, a phenyl group and a substituted phenyl group in which the substituent is selected from the group consisting of Cl, $CH_3$ and $OCH_3$.

DESCRIPTION OF THE PRIOR ART

U.S. Pat. No. 3,577,425 discloses compounds of the formula:

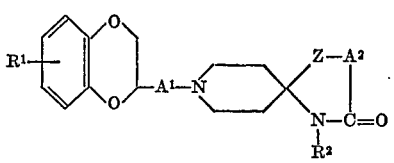

and the pharmaceutically acceptable acid addition salts thereof, wherein $R^1$ is H, Cl, methyl or methoxy; $R^2$ is H, an alkyl group of 1 to 4 carbon atoms, a benzyl group, a phenyl group or a substituted phenyl group in which the substituent is selected from the group consisting of Cl, methyl, methoxy and trifluoromethyl; $A^1$ is —$CH_2$—, —$CH_2CH_2$—, —CO— or —$CH_2CO$—, the carbonyl portion of which is bound to the N atom of the piperidine ring or —CH(OH)$CH_2$— the methylene (—$CH_2$—) portion of which is bound to the N atom of the piperidine ring; $A^2$ is —$CH_2$—, or =$CHCH_3$, and Z is —S—, —SO— or —$SO_2$—. These compounds are useful as vasidilators of low toxicity in animals.

In our copending application, filed Mar. 1, 1971, Ser. No. 119,916, there are disclosed compounds of the formula:

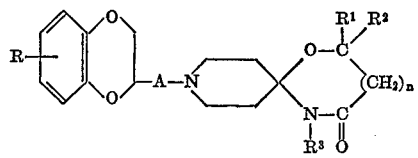

and the pharmaceutically acceptable acid addition salts thereof, wherein R is a member selected from the group consisting of H, halogen, a lower alkyl group of 1 to 4 carbon atoms and a lower alkoxy group of 1 to 4 carbon atoms; each of $R^1$ and $R^2$ is a member selected from the group consisting of H, a lower alkyl group of 1 to 4 carbon atoms and a phenyl group; $R^3$ is a member selected from the group consisting of H and a lower alkyl group of 1 to 4 carbon atoms; A is a lower alkylene group of 1 to 4 carbon atoms; and n is 0 or 1. These compounds are likewise useful as vasodilators.

SUMMARY OF THE PRESENT INVENTION

This invention relates to novel and therapeutically valuable compounds of the formula:

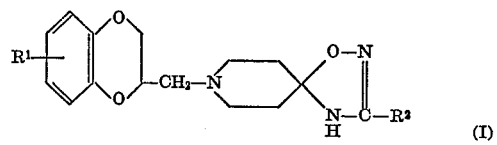

and the pharmaceutically acceptable acid addition salts thereof, wherein $R^1$ is H, Cl, $CH_3$ or $OCH_3$ and $R^2$ is an alkyl group of 1 to 3 carbon atoms, a benzyl group, a phenyl group or a substituted phenyl group in which the substituent is selected from the group consisting of Cl, $CH_3$ and $OCH_3$.

The compounds of Formula I can be produced by the reaction of a compound of the formula:

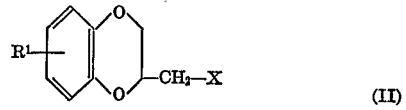

wherein X is halogen or reactive radical, such as methylsulfonyloxy or tolylsulfonyloxy, with a compound of the formula:

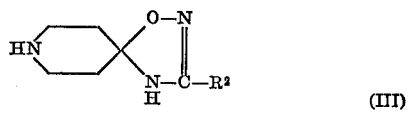

$R^1$ and $R^2$ are as defined above.

This reaction is usually carried out in a solvent in the presence of a deacidifying agent, and if necessary, in the presence of a reaction accelerator, under reflux at about the boiling point of the solvent employed for a period of from 10 to 20 hours. The solvent may be an alcohol (e.g., methanol, ethanol, 2-propanol), a ketone (e.g., acetone, methyl ethyl ketone), an aromatic hydrocarbon (e.g., benzene, toluene, xylene), an ether (e.g., dioxane, tetrahydrofuran), an ester (e.g., ethyl acetate, butyl acetate) or dimethylformamide. The deacidifying agent may be an alkali metal carbonate (e.g. $Na_2CO_3$, $K_2CO_3$), an alkali metal hydrogen carbonate (e.g., $NaHCO_3$, $KHCO_3$), an alkali metal alkoxide (e.g., sodium ethoxide, potassium methoxide), triethylamine, N,N-dimethylaniline or pyridine. The reaction accelerator may be an alkali metal iodide (e.g., NaI, KI).

The compounds of Formula I can be converted into acid addition salts with various inorganic acids (e.g., hydrochloric, hydrobromic, nitric, sulfuric acid) or with various organic acids (e.g., oxalic, maleic, fumaric, tartaric acid).

The intermediate of Formula III, which are also new can be produced by the following methods:

(a) By the reaction of a compound of the formula:

wherein $R^3$ is H or $R^4$—OCO— ($R^4$ being $C_{1-2}$ alkyl or benzyl), with a compound of the formula

wherein $R^2$ is defined as above.

This reaction is usually carried out in a solvent, such as benzene, toluene, xylene, chloroform, dichloroethane, carbon tetrachloride, methanol, ethanol, 2-propanol or dioxane, and if necessary, in the presence of an acid catalyst, such as p-toluenesulfonic, benzenesulfonic, methanesulfonic, hydrochloric or sulfuric acid, under reflux for 3 to 20 hours, while the water formed is removed from the reaction system.

(b) By the elimination of the $R^4$—OCO— group of the compounds produced by the above method (a) and having the formula:

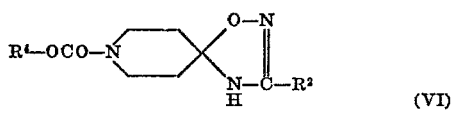

wheerin $R^2$ and $R^4$ are defined above.

The $R^4$—OCO— elimination is carried out by treating a Compound VI with an acid, such as hydrogen chloride, hydrogen bromide, hydrogen gluoride or perchloric acid in a solvent, preferably with 10–25% hydrogen bromide in acetic acid, under anhydrous conditions to avoid the decomposition of the spiro ring, or with an alkali, such as sodium hydroxide, potassium hydroxide, barium hydroxide, calcium hydroxide or magnesium hydroxide in a solvent, such as water, methanol, ethanol, 2-propanol, butanol, ethylene glycol, dimethylene glycol or trimethylene glycol, at about the boiling point of the solvent employed for 2 to 25 hours.

The compounds of Formula I as well as their pharmaceutically acceptable acid addition salts, in animal test, increase femoral blood flow as shown by the following test:

The fermoral blood flow was measured by Ohashi-Yago's method (N. Yago: Foria Pharmacologica Japonica, vol. 57, p. 380 (1961)) using a secobarbital anesthetized dog (male adult), the test compound being administered intravenously. The increase (percent) of the femoral blood flow was calculated by the following formula:

$$\text{Increase (percent)} = \frac{a-b}{b} \times 100$$

$a$: Maximum femoral blood flow after the administration of the test compound.
$b$: Mean femoral blood flow below the administration of the test compound.

The results are shown in the following table:

| Dose γ/kg | Increase (percent) of blood flow in the femoral artery | | | | | | |
|---|---|---|---|---|---|---|---|
| | 1 | 2.5 | 5 | 10 | 25 | 50 | 100 |
| Test compound: | | | | | | | |
| A | 11 | 42 | 72 | 186 | 324 | 385 | 593 |
| B | 0 | 0 | 28 | 88 | 232 | 182 | 248 |
| C | 0 | | 10 | 73 | 88 | 209 | 261 |
| D (for comparison) | 0 | 32 | 52 | 76 | 105 | 129 | 145 |

NOTE.—In the above table, the test compounds (A, B, C and D) ar as follows:
A: 8-(1,4-benzodioxan-2-ylmethyl)-3-phenyl-1-oxa-2,4,8-triazaspiro-[4,5]dec-2-ene hydrochloride:
B 8-(1,4-benzodioxan-2-ylmethyl)-3-p-tolyl-1-oxa-2,4,8-triazaspiro-[4,5]dec-2-ene maleate;
C: 8-(8-methoxy-1,4-benzodioxan-2-ylmethyl)-3-phenyl-1-oxa-2,4,8-triazaspiro-[4,5]dec-2-ene maleate;
D: 8-(1,4-benzodioxan-2-ylmethyl)-3-oxo-1-thia-4,8-diazaspiro[4,5]decane maleate (a compound disclosed in U.S. Patent 3,577,425)

The Compounds I and pharmaceutically acceptable acid addition salts thereof are useful, for example, as vasodilators, and especially for the treatment of peripheral vascular disturbances, in the form of a pharmaceutical composition in admixture with a suitable and conventional carrier or adjuvant, administered orally or by injection, without accompanying toxicity to the host.

The pharmaceutical composition may take the form of tablets, granules, powder, syrup or an injectable solution and may be administered parenterally or orally. The normal daily dose of the active ingredient (I), or salts thereof, is in the range of from 60 to 120 milligrams per human adult.

The choice of carriers is determined by the preferred form of administration, the solubility of the compounds and standard pharmaceutical practice. The following are the examples of the formulae to be taken when the Compound I of the present invention is administered for the pharmaceutical purposes.

(i) 10 mg. tablet:

| | Mg. |
|---|---|
| Compound A | 10 |
| Lactose | 80 |
| Microcrystalline cellulose | 10 |
| Starch | 15 |
| Methyl cellulose | 1 |
| Talc | 3 |
| Magnesium stearate | 1 |
| Total (per tablet) | 120 |

(ii) 1% injectable solution:

| | |
|---|---|
| Compound A | 20 |
| Sodium chloride | 18 |
| Water for injection: A sufficient amount to make 2 ml. | |

The present invention will be better understood from the following examples, which are merely intended to be illustrative and not limitative of the present invention.

Example 1

A mixture of 22 g. of 2-p-tolylsulfonyloxymethyl-1,4-benzodioxane 15 g. of 3-phenyl-1-oxa-2,4,8-triazaspiro[4,5]dec-2-ene and 10 g. of sodium carbonate in a solvent of 150 ml. of toluene plus 70 ml. of dimethylformamide is refluxed with stirring for 18 hours. After cooling, the insoluble matter is filtered off and the filtrate is concentrated under reduced pressure. The residue solidifies when water is added. The precipitate obtained is collected by filtration, washed with water and recrystallized from ethanol to give 10 g. of 8-(1,4-benzodioxan-2-ylmethyl)-3-phenyl-1-oxa-2,4,8-triazaspiro[4,5]dec-2-ene as white crystals melting at 160–161° C. Its hydrochloride salt melts at 238–241° C. with decomposition.

Example 2

A mixture of 12 g. of 2-p-tolylsulfonyloxymethyl-1,4-benzodioxane, 13.2 g. of 3-p-methoxyphenyl-1-oxa-2,4,8-triazaspiro[4,5]dec-2-ene hydrobromide, 13 g. of potassium carbonate and 0.2 g. of potassium iodide in a solvent of 100 ml., of dimethylformamide plus 100 ml. of ethanol is refluxed with stirring for 16 hours. After cooling, the insoluble matter is filtered off and the filtrate is concentrated under reduced pressure. The residue is extracted with chloroform, the chloroform layer is washed three times with water and dried over anhydrous magnesium sulfate, and then the chloroform is distilled off. The greyish white solid obtained is recrystallized twice from 2-propanol to give 7 g. of 8-(1,4-benzodioxan-2-ylmethyl)-3-p-methoxyphenyl-1-oxa-2,4,8-triazaspiro[4,5]dec-2 - ene as white crystals melting at 132–134° C. Its maleate salt melts at 190° C.

Using the procedures set forth in the above examples, but substituting equivalent amounts of appropriate starting materials, the following compounds are produced:

(3) 8 - (1,4 - benzodioxan - 2 - ylmethyl) - 3 - p - tolyl-1-oxa-2,4,8-triazaspiro[4,5]dec-2-ene melting at 186–187° C., and its maleate melting at 204° C. (decomposition), (4) 8 - (1,4 - benzodioxan - 2 - ylmethyl) - 3 - benzyl-1-oxa-2,4,8-triazaspiro[4,5]dec-2-ene hydrochloride melting at 211° C. (decomposition), (5) 8 - (1,4 - benzodioxan - 2 - ylmethyl) - 3 - propyl-1oxa-2,4,8-triazaspiro[4,5]dec-2-ene hydrochloride melting at 212–214° C. (decomposition), (6) 8 - (7 - chloro - 1,4 - benzodioxan - 2 - ylmethyl)-3-p-tolyl-1-oxa-2,4,8-triazaspiro[4,5]dec - 2 - ene maleate melting at 195° C. (decomposition), (7) 8 - (7 - methyl - 1,4 - benzodioxan - 2 - ylmethyl)-3-phenyl-1-oxa-2,4,8-triazaspiro[4,5]dec-2-ene melting at 175° C., and its maleate melting at 198–199° C., (8) 8 - (8 - methoxy-1,4 - benzodioxan - 2 - ylmethyl)-3-phenyl-1-oxa-2,4,8-triazaspiro[4,5]dec - 2 - ene maleate melting at 200–201° C., and (9) 8 - (1,4 - benzodioxan - 2 - ylmethyl) - 3 - p - chlorophenyl-1-oxa-2,4,8-triazaspiro[4,5]dec-2-ene melting at 189–190° C., and its hydrochloride melting at 242–243° C. (decomposition).

Specific examples of the preparation of the starting Compounds III are as follows:

(a) A mixture of 23.8 g. of 1-ethoxycarbonyl-4-oxopiperidine, 13.6 g. of benzamidoxime, 0.5 g. of p-toluenesulfonic acid and 100 ml. of toluene is refluxed for 4 hours in a flask fitted with a water-removing adaptor. Then the crystals precipitated are collected by filtration and recrystallized twice from 2-propanol to give 12 g. of 8 - ethoxycarbonyl - 3 - phenyl - 1 - oxa - 2,4,8 - triazaspiro-[4,5]dec-2-ene as white crystals melting at 183–184° C.

(b) 15 g. of 8-ethoxycarbonyl-3-phenyl-1oxa-2,4,8-triazaspiro[4,5]dec-2-ene is added to 170 ml. of a 20% solution of hydrogen bromide in acetic acid, and the resulting mixture is heated on a water bath for 3 hours. Then the reaction mixture is cooled, and the crystals precipitated are collected by filtration and recrystallized from ethanol to give 6 g. of 3-phenyl-1-oxa-2,4,8-triazaspiro[4,5]dec-2-ene hydrobromide as white crystals melting at 232° C. with decomposition.

(c) A mixture of 15 g. of 8-ethoxycarbonyl-3-p-tolyl-2,4,8-triazaspiro[4,5]dec-2-ene (M.P. 192° C.), 25 g. of Ba(OH)·8H₂O, 250 ml. of water and 50 ml. of ethanol is refluxed with stirring for 18 hours. Then the reaction mixture is extracted three times with chloroform, the chloroform phase is washed twice with water and dried over anhydrous magnesium sulfate, and the chloroform is distilled off. The brown solid obtained is recrystallized from 2-propanol to give 5 g. of 3-p-tolyl-1-oxa-2,4,8-triazaspiro-[4,5]dec-2-ene as white crystals melting at 193–194° C. Its hydrobromide melts at 247° C. with decomposition.

Similarly, the following compounds are produced:

(1) 3 - 1 - methoxyphenyl-1-oxa-2,4,8-triazaspiro[4,5] dec-2-ene melting at 194° C. and its hydrobromide melting at 245° C. (decomposition);

(2) 3 - p - chlorophenyl - 1 - oxa - 2,4,8 - triazaspiro-[4,5]dec-2-ene hydrobromide melting at 244–245° C. (decomposition);

(3) 3 - benzyl - 1 - oxa - 2,4,8 - triazaspiro[4,5]dec - 2 - ene hydrobromide melting at 207–210° C. (decomposition; and (4) 3 - propyl - 1 oxa - 2,4,8 - triazaspiro[4,5]dec-2-ene hydrobromide melting at 197–199° C. (decomposition).

Although the present invention has been adequately set forth in the foregoing specification and examples included therein, it is readily apparent that various modifications and changes may be made without departing from the spirit and scope thereof.

What is claimed is:
1. A 1-oxa-2,4,8-triazaspiro[4.5]dec-2-ene compound of the formula:

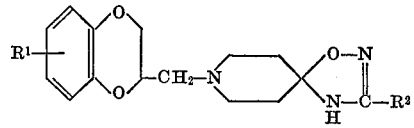

and the pharmaceutically acceptable acid addition salts thereof, wherein R¹ is a member selected from the group consisting of H, Cl, CH₃ or OCH₃ and R² is a member selected from the group consisting of an alkyl group of from 1 to 3 carbon atoms, a benzyl group, a phenyl group and a substituted phenyl group in which said substituent is a member selected from the group consisting of Cl, CH₃ and OCH₃.

2. The compound of claim 1: 8-(1,4-benzodioxan-2-ylmethyl)-3-phenyl-1-oxa-2,4,8-triazaspiro/4.5/dec.-2-ene.

3. The compound of claim 1: 8-(1,4-benzodioxan-2-ylmethyl)-3-p-tolyl-1-oxa-2,4,8-triazaspiro/4.5/dec.2-ene.

4. The compound of claim 1: 8-(8-methoxy-1,4-benzodioxan-2-ylmethyl)-3-phenyl - 1 - oxa - 2,4,8 - triazaspiro/4.5/dec-2-ene.

5. A compound of the formula:

wherein R² is a member selected from the group consisting of an alkyl group of from 1 to 3 carbon atoms, a benzyl group, a phenyl group, and a substituted phenyl group in which the substituent is a member selected from the group consisting of Cl, CH₃ and OCH₃.

6. The compound of claim 1: 81(1,4-benzodioxan-2-ylmethyl) - 3 - propyl - 1 -oxa - 2,4,8 - triazaspiro[4.5]dec-2-ene hydrochloride.

7. The compound of claim 1: 8-7-chloro-1,4-benzodioxan - 2 - ylmethyl - 3 - p - tolyl - 1 - oxa - 2,4,8 - triazasprio[4.5]dec-2-ene maleate.

8. The compound of claim 1: 8-(7-methyl-1,4-benzodioxan - 2 - ylmethyl) - 3 - phenyl - 1 - oxa - 2,4,8 - triazaspiro[4.5]dec-2-ene.

9. The compound of claim 1: 8-(1,4-benzodioxan-2-ylmethyl)-3-p-chlorophenyl-1-oxa - 2,4,8 - triazaspiro[4.5] dec-2-ene.

10. The compound of claim 5: 3-p-methoxyphenyl-1-oxa-2,4,8-triazaspiro[4.5]dec-2-ene.

11. The compound of claim 5: 3-p-chlorophenyl-1-oxa-2,4,8-triazaspiro[4.5]dec-2-ene hydrobromide.

12. The compound of claim 5: 3-benzyl-1-oxa-2,4,8-triazaspiro[4.5]dec-2-ene hydrobromide.

13. The compound of claim 5: 3-propyl-1-oxa-2,4,8-triazaspiro[4.5]dec-2-ene hydrobromide.

References Cited
UNITED STATES PATENTS
3,577,425   5/1971   Nakenishi et al. ____ 260—293.4

HENRY R. JILES, Primary Examiner
G. T. TODD, Assistant Examiner

U.S. Cl. X.R.
260—293.58, 340.3; 424—267